US010647618B2

United States Patent
Schaedler

(10) Patent No.: US 10,647,618 B2
(45) Date of Patent: May 12, 2020

(54) THERMAL AND ENVIRONMENTAL BARRIER COATING FOR CERAMIC SUBSTRATES

(71) Applicant: HRL LABORATORIES, LLC, Malibu, CA (US)

(72) Inventor: Tobias A. Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 697 days.

(21) Appl. No.: 14/666,745

(22) Filed: Mar. 24, 2015

(65) Prior Publication Data

US 2017/0015600 A1    Jan. 19, 2017

(51) Int. Cl.

| C04B 41/87 | (2006.01) |
| C04B 41/86 | (2006.01) |
| C04B 41/52 | (2006.01) |
| C04B 41/50 | (2006.01) |
| C04B 41/00 | (2006.01) |

(Continued)

(52) U.S. Cl.
CPC ............ *C04B 41/87* (2013.01); *C04B 41/009* (2013.01); *C04B 41/5024* (2013.01); *C04B 41/52* (2013.01); *C04B 41/86* (2013.01); *C09D 1/00* (2013.01); *C09D 7/70* (2018.01)

(58) Field of Classification Search
CPC ................................ C04B 41/87; C04B 41/86
See application file for complete search history.

(56) References Cited

U.S. PATENT DOCUMENTS 4,552,806 A * 11/1985 Hayashi ................. B32B 17/06
                                                               428/312.6
5,179,048 A *  1/1993 Niebylski ............. C04B 35/589
                                                               106/287.23

(Continued)

FOREIGN PATENT DOCUMENTS

JP       2003-335588 A     11/2003
JP        2009243352 A     10/2009

(Continued)

OTHER PUBLICATIONS

Arthur, K; Ampaw, E.; Azeko, S.; Danyuo, Y.; Agyei-Tuffour, B.; Kan-Dapaah, K.; Obayemi, J.; "Design of Thermally Reliable Environmental Barrier Coating for a SiC/SiC Ceramic Matrix Composites", International Journal of Composite Materials, 2013, vol. 3, pp. 191-197.*

(Continued)

*Primary Examiner* — Mark Ruthkosky
*Assistant Examiner* — Julia L Rummel
(74) *Attorney, Agent, or Firm* — Lewis Roca Rothgerber Christie, LLP

(57) ABSTRACT

A thermal and environmental barrier coating composed of ceramic hollow microspheres sintered together. In one embodiment the microspheres are sintered together with a powder of another material that acts as a binder, or with a powder of a material that may be the same as the material of the hollow microspheres, forming a matrix in which the hollow microspheres are embedded. The hollow microspheres may be composed of a material with a high temperature capability, and with a low coefficient of thermal expansion.

2 Claims, 5 Drawing Sheets

(51) Int. Cl.
*C09D 1/00* (2006.01)
*C09D 7/40* (2018.01)

(56) References Cited

U.S. PATENT DOCUMENTS

| | | | |
|---|---|---|---|
| 6,071,628 | A | 6/2000 | Seals et al. |
| 6,884,384 | B2 | 4/2005 | Merrill et al. |
| 7,740,960 | B1 | 6/2010 | Zhu et al. |
| 2003/0077473 | A1 | 4/2003 | Bretschneider et al. |
| 2003/0080477 | A1* | 5/2003 | Merrill ............ B28B 1/265 264/637 |
| 2003/0104147 | A1 | 6/2003 | Bretschneider et al. |
| 2006/0211241 | A1* | 9/2006 | Govern ............ C04B 41/009 438/653 |
| 2007/0237667 | A1* | 10/2007 | Merrill ............ C04B 38/08 419/5 |
| 2008/0035021 | A1 | 2/2008 | Sambasivan et al. |
| 2009/0130424 | A1 | 5/2009 | Tholen et al. |
| 2009/0220776 | A1 | 9/2009 | Meschter et al. |
| 2013/0156958 | A1* | 6/2013 | Belov ............ C23C 24/08 427/372.2 |
| 2013/0177740 | A1 | 7/2013 | Merrill et al. |

FOREIGN PATENT DOCUMENTS

| | | |
|---|---|---|
| WO | WO 01/073147 A2 | 10/2001 |
| WO | WO 01/073147 A3 | 10/2001 |
| WO | WO 2008/110161 A1 | 9/2008 |
| WO | WO 2009/020206 | 2/2009 |
| WO | WO 2014/204480 A1 | 12/2014 |
| WO | WO 2015/042491 A1 | 3/2015 |
| WO | WO 2015/042491 A4 | 3/2015 |

OTHER PUBLICATIONS

English language translation of WO2008110161, generated on Feb. 21, 2019 with Espacenet website (https://www.epo.org/searching-for-patents/technical/espacenet.html#tab-1).*

Clarke et al., "Materials Design for the Next Generation Thermal Barrier Coatings," Annu. Rev. Mater. Res., 33:383-417, 2003.

Evans et al., "The Mechanics of Coating Delamination in Thermal Gradients," Surface & Coatings Technology, 201:7905-7916, 2007.

Fritsch et al., "Water-Vapor Hot Gas Corrosion of Ceramic Materials in a Combustion Atmosphere," Fraunhofer IKTS, Annual Report, p. 27, 2006.

Göhler et al., "Metallic Hollow Sphere Structures—Status and Outlook," CellMat Conference Proceedings, 9 pages, 2010.

Grant et al., "Calcium-Magnesium Alumino-Silicate Interaction with Yttrium Monosilicate Environmental Barrier Coatings," J. Am. Ceram. Soc., 93(10):3504-3511, 2010.

Grant et al., "CMAS Degradation of Environmental Barrier Coatings," Surface & Coatings Technology, 202:653-657, 2007.

Kosaka et al., "Concept of "Temperature Swing Heat Insulation" in Combustion Chamber Walls, and Appropriate Thermo-Physical Properties for Heat Insulation Coat," SAE Int. J. Engines, 6(1):142-149, May 2013.

Ma et al., "New Generation Perovskite Thermal Barrier Coating Materials," Journal of Thermal Spray Technology, 17(5-6):831-837, Mid-Dec. 2008.

Miller, Robert A., "History of Thermal Barrier Coatings for Gas Turbine Engines," NASA/TM, 29 pages, Mar. 2009.

Solórzano et al., "Thermal Properties of Hollow Spheres," Multi-functional Metallic Hollow Sphere Struct., EM, 89-107, Springer-Verlag Berlin Heidelberg, 2009.

International Search Report and Written Opinion dated Oct. 12, 2016 for corresponding PCT Application No. US2015/042085 (12 pages).

International Preliminary Report on Patentability for corresponding PCT Application No. PCT/US2015/042085, dated Apr. 11, 2017 (8 pages).

Extended European Search Report dated Oct. 18, 2018 for corresponding Application No. EP 15886695.4 (9 pages).

* cited by examiner

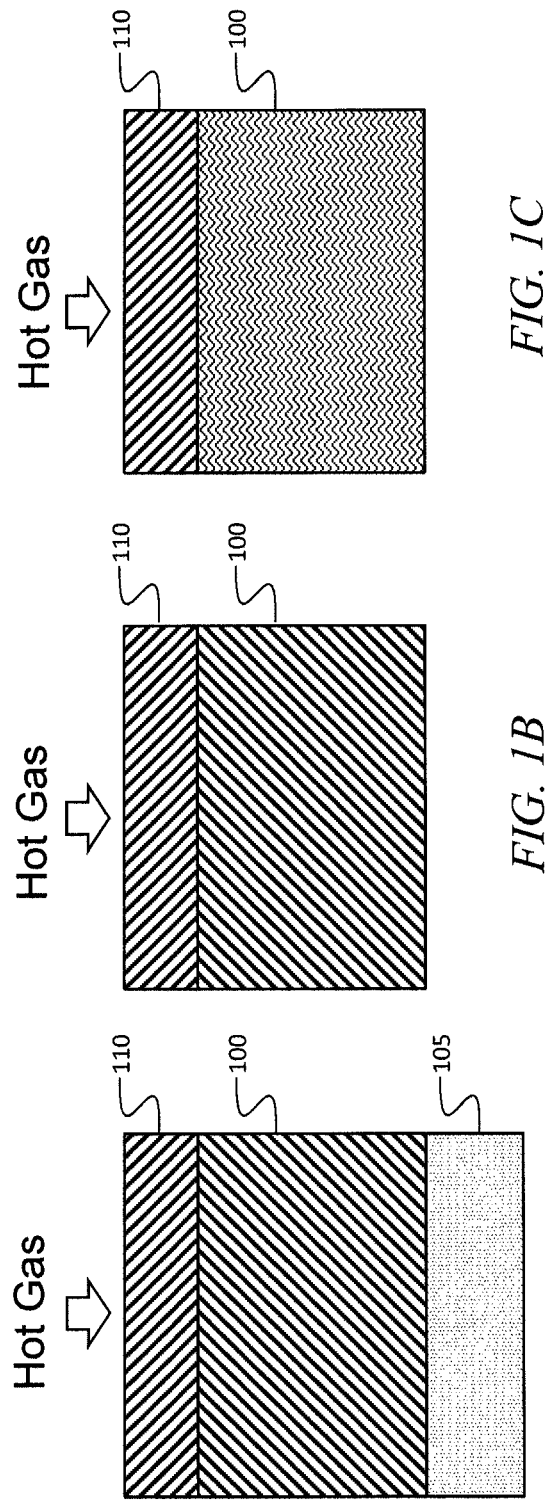
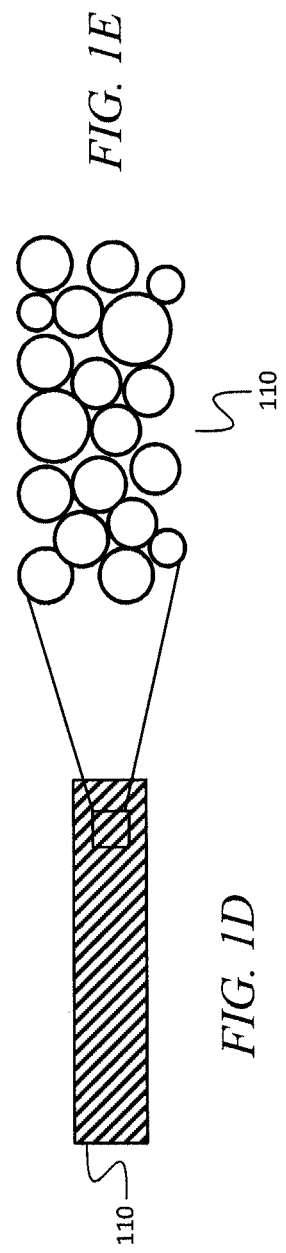

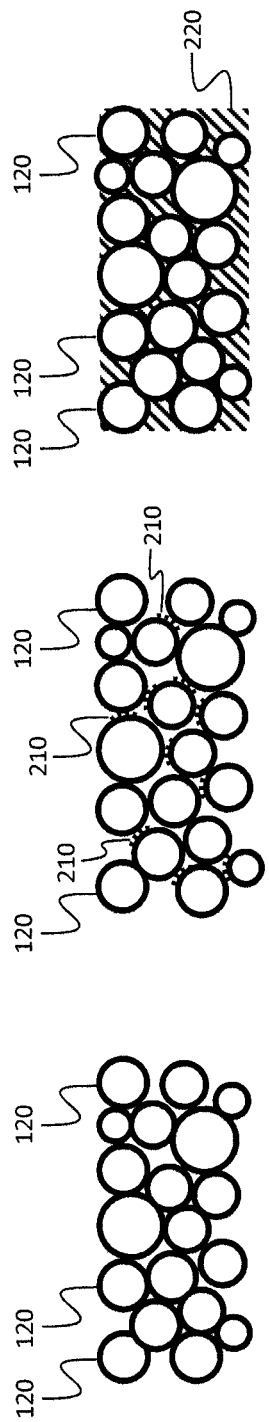

THERMAL AND ENVIRONMENTAL BARRIER COATING FOR CERAMIC SUBSTRATES

CROSS-REFERENCE TO RELATED APPLICATION(S)

The present application is related to U.S. patent application Ser. No. 14/491,974, filed on Sep. 19, 2014 titled "THERMAL BARRIER MATERIALS AND COATINGS WITH LOW HEAT CAPACITY AND LOW THERMAL CONDUCTIVITY", the entire contents of which are incorporated herein by reference.

FIELD

The following description relates to systems for providing thermal protection, and more particularly to a thermal barrier coating containing ceramic hollow microspheres.

BACKGROUND

Mechanical structures interacting with high-temperature gases, such as jet engine exhaust systems, the exterior surfaces of hypersonic aircraft, and furnace liners, may be composed of a metal component providing strength, and coated with, e.g., a ceramic coating to provide thermal protection, preventing the metal component from being weakened by heating. In such an application, a coating with low thermal conductivity may be desirable, to reduce heat flow into the metal component.

Certain related art ceramic coatings, such as 7 wt % yttria-stabilized zirconia thermal barrier coatings (TBCs) have a thermal conductivity in the range of 0.8-1.6 W/mK (Watts per meter-Kelvin) at room temperature. Such a coating may be applied utilizing either a plasma spray process or an electron-beam physical vapor deposition process, which may result in a porosity of 10-20%. A lower thermal conductivity would be beneficial. Related art TBCs focus on protecting metal components, but are not well compatible with ceramic components due to their different coefficient of thermal expansion.

Thus, there is a need for a system and method of providing improved thermal and environmental protection for ceramic components exposed to high-temperature gases.

SUMMARY

Aspects of embodiments of the present disclosure are directed toward a thermal and environmental barrier coating composed of ceramic hollow microspheres sintered together. In one embodiment the microspheres are sintered together with a powder of another material that acts as a binder, or with a powder of a material that may be the same as the material of the hollow microspheres, forming a matrix in which the hollow microspheres are embedded. The thermal and environmental barrier coating may have low conductivity as a result of including the hollow microspheres, and may be composed of a material with a high temperature capability, and with a low coefficient of thermal expansion similar to the ceramic substrate.

According to an embodiment of the present invention there is provided a article, including: a ceramic substrate, and a thermal barrier coating covering a surface of the ceramic substrate, the thermal barrier coating having: a void volume fraction of at least 60% and a major part of the void volume being closed porosity, the thermal barrier coating including, as a major component, a plurality of hollow particles, each of the plurality of hollow particles including, as a major component, a first material, each of the plurality of hollow particles having: a maximum interior dimension less than about 1 millimeter (mm) and greater than about 5 micrometers, and a maximum wall thickness less than about 1/10 of the maximum interior dimension.

In one embodiment, each of a major portion of the plurality of hollow particles has a shape selected from the group consisting of ellipsoids, rods, cubes, spheres and combinations thereof.

In one embodiment, each of a major portion of the plurality of hollow particles has a substantially circular cross section with a diameter less than about 1 millimeter (mm) and greater than about 5 micrometers.

In one embodiment, the article includes, as a major component, a second material different from the first material.

In one embodiment, the plurality of hollow particles are sintered together.

In one embodiment, the article includes a bond coat between the ceramic substrate, and the thermal barrier coating.

In one embodiment, the bond coat includes, as a major component, a material selected from the group consisting of $SiO_2$, $Al_2O_3$, $B_2O_3$, and combinations thereof.

In one embodiment, the article includes a capping layer covering a portion of a surface of the thermal barrier coating, the capping layer having a porosity less than 10% and a thickness less than about 1/10 of the thickness of the thermal barrier coating.

In one embodiment, the article includes as a major component, a substance selected from the group consisting of silica, alumina, silicon oxycarbide, and combinations thereof ceramic matrix composites including fibers, the fibers including, as a major component, a substance selected from the group consisting of SiC, $Si_3N_4$, C, $Al_2O_3$, $Al_6Si_2O_{13}$, and combinations thereof, and combinations thereof.

In one embodiment, the article includes silica as a major component.

In one embodiment, the article includes, as a major component, a second material, the second material being the same as the first material.

In one embodiment, the article includes, as a major component, a second material different from the first material.

In one embodiment, the first material is selected from the group consisting of: rare earth silicates, rare earth aluminates, rare earth gallates, zirconate perovskites, hafnium titanates, zirconium titanates, monoclinic hafnias, scandium tantalates, aluminosilicate glasses, alumino silicate mullites, silicon oxycarbide glasses, zirconium silicates, magnesium aluminate spinels, zinc aluminate spinels, aluminum phosphates, cordierites, calcium aluminates, silicon aluminum oxynitrides and combinations thereof.

In one embodiment, the first material is selected from the group consisting of: yttrium disilicates, monoclinic rare earth aluminates, rare earth gallates, calcium di-aluminate and combinations thereof.

In one embodiment, the second material is selected from the group consisting of: rare earth silicates, rare earth aluminates, rare earth gallates, zirconate perovskites, hafnium titanates, zirconium titanates, monoclinic hafnias, scandium tantalates, aluminosilicates, mullites, silicon oxycarbides, zircons, magnesium aluminate spinels, aluminum phosphates, and combinations thereof.

According to an embodiment of the present invention there is provided a thermal and environmental barrier material including, as a major component, a plurality of hollow particles, each of the plurality of hollow particles including, as a major component, a first material, each of the plurality of hollow particles having: a maximum interior dimension less than about 1 millimeter (mm) and greater than about 5 micrometers, and a maximum wall thickness less than about $1/10$ of the maximum interior dimension, the first material being selected from the group consisting of: rare earth silicates, rare earth aluminates, rare earth gallates, zirconate perovskites, hafnium titanates, zirconium titanates, monoclinic hafnias, scandium tantalates, aluminosilicate glasses, silicon oxycarbides, zircons, magnesium aluminate spinels, aluminum phosphates, and combinations thereof.

In one embodiment, each of a major portion the plurality of hollow particles has a shape selected from the group consisting of ellipsoids, rods, cubes, spheres and combinations thereof.

In one embodiment, the material includes, as a major component, a second material different from the first material.

In one embodiment, the material includes, as a major component, a second material different from the first material.

In one embodiment, the particles of the plurality of hollow particles are sintered together.

According to an embodiment of the present invention there is provided a method of forming an article, the method including: receiving a ceramic substrate; forming a thermal barrier coating on the ceramic substrate, the thermal barrier coating to include, as a major component, a plurality of hollow particles, each of the plurality of hollow particles including, as a major component, a first material, the first material being selected from the group consisting of: rare earth silicates, rare earth aluminates, rare earth gallates, zirconate perovskites, hafnium titanates, zirconium titanates, monoclinic hafnias, scandium tantalates, aluminosilicate glasses, silicon oxycarbides, zircons, magnesium aluminate spinels, aluminum phosphates, and combinations thereof.

In one embodiment, the method includes, as a major component, a second material different from the first material.

In one embodiment, the forming of the thermal barrier coating on the ceramic substrate includes: applying the plurality of hollow particles to the substrate by a process selected from the group consisting of painting, spraying, dipping, tape casting, doctor blading, and combinations thereof, and sintering together the hollow particles of the plurality of hollow particles.

In one embodiment, the forming of the thermal barrier coating includes adjusting a coefficient of thermal expansion of the thermal barrier coating by selecting a first material with a suitable coefficient of thermal expansion.

BRIEF DESCRIPTION OF THE DRAWINGS

These and other features and advantages of the present invention will be appreciated and understood with reference to the specification, claims and appended drawings wherein:

FIG. 1A is a schematic layer diagram of a thermal barrier coating on a ceramic substrate composed of ceramic foam, on a metallic substructure, according to an embodiment of the present invention;

FIG. 1B is a schematic layer diagram of a thermal barrier coating on a ceramic substrate composed of ceramic foam, according to an embodiment of the present invention;

FIG. 1C is a schematic layer diagram of a thermal barrier coating on a ceramic substrate composed of ceramic matrix composite, according to an embodiment of the present invention;

FIG. 1D is a schematic layer diagram of a thermal barrier coating, according to an embodiment of the present invention;

FIG. 1E is a magnified diagram of a portion of the thermal barrier coating of FIG. 1D, showing the structure of a thermal barrier coating, according to an embodiment of the present invention;

FIG. 2A is a cross-sectional illustration of hollow microspheres sintered together according to an embodiment of the present invention;

FIG. 2B is a cross-sectional illustration of hollow microspheres sintered together with a binder according to an embodiment of the present invention;

FIG. 2C is a cross-sectional illustration of hollow microspheres sintered together in a matrix according to an embodiment of the present invention;

DETAILED DESCRIPTION

Figure 3C:
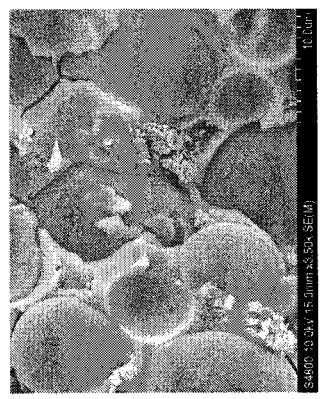
FIG. 3C is a scanning electron micrograph of hollow microspheres sintered together in a matrix according to an embodiment of the present invention.

The detailed description set forth below in connection with the appended drawings is intended as a description of exemplary embodiments of a thermal and environmental barrier coating for ceramic substrates provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of present invention." Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items means at least half of the items. A "nanopowder" means a powder in which a majority of the particles are less than 1 micrometer (micron) in size.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Referring to FIG. 1A, in one embodiment a ceramic substrate 100 forms a protective layer over a metallic substructure 105 and an additional thermal barrier coating 110 covers the ceramic substrate 100, providing protection for the ceramic substrate 100. The ceramic substrate 100 may, for example, be a layer of ceramic foam providing thermal protection for the metal substructure 105. The assembly may be exposed to high-temperature gas, e.g., hot exhaust gas in a jet engine. In this embodiment, the thermal barrier coating 110 is composed of a material that can withstand higher temperatures than the ceramic substrate 100, and that can withstand contact with the high-temperature gas. The thermal barrier coating 110 also has sufficiently low thermal conductivity to protect the ceramic substrate 100 from the hot gas. In other embodiments the thermal barrier coating 110 simply protects a ceramic substrate 100, without an underlying metal substructure (FIG. 1B), as in the case of a high temperature tile that may be installed on the exterior of a hypersonic vehicle, or the thermal barrier coating 110 may protect a ceramic substrate 100 that is a ceramic matrix composite (FIG. 1C). The ceramic matrix composite may be based on fibers that are mostly carbon, SiC— or $Si_3N_4$. $Al_2O_3$— or mullite-fiber based composites may also be protected utilizing a thermal barrier coating 110, although the coefficient of thermal expansion of these ceramic matrix composite materials is higher (being of order $8*10^{-6}$/K), which may require adjusting the coefficient of thermal expansion of the thermal barrier coating 110. A bond layer may be utilized between the ceramic element and the thermal barrier coating 110, and a capping layer may be utilized on the exterior of the thermal barrier coating 110.

Referring to FIG. 1D, in one embodiment, the thermal barrier coating 110 is composed of hollow microspheres 120, and low thermal conductivity is achieved by introducing, by the inclusion of the hollow microspheres 120, a suitable cellular architecture into the thermal barrier coating 110. The high fraction of closed cell porosity on the micron scale, resulting from the inclusion of the hollow microspheres 120, can lower the effective conductivity of the thermal barrier coating by a factor of up to 100. The thermal barrier coating 110 may consist simply of the hollow microspheres sintered together, or of the hollow microspheres with a coating of binder to better bind them together, or of the hollow microspheres embedded in a matrix. In one embodiment, since the porosity is closed and may average only about 50 microns in diameter and constitute a volume fraction of 80-90%, the use of hollow microspheres 120 is very efficient in decreasing the thermal conductivity. In one embodiment, the hollow spheres have an outer diameter of 20-100 microns, and a wall thickness of 0.5-3 microns.

The hollow microspheres may be composed of various materials, selected for their ability to withstand high temperatures, and for a low coefficient of thermal expansion (CTE). The CTE of the thermal barrier coating 110 may be adjusted by selecting a material, for the hollow microspheres, with a suitable CTE. A low coefficient of thermal expansion (CTE), and a high volume fraction of porosity resulting in a low elastic modulus of the coating, alone or in combination, reduce the likelihood that during thermal cycling, sufficient stress will be produced in the thermal barrier coating 110 or in the ceramic substrate to cause spallation or the formation of microcracks in the thermal barrier coating 110 or in the ceramic substrate. The desire for a low steam recession rate may also be a factor in selecting materials.

The hollow microspheres may be composed, for example, of one or more rare earth silicates, including yttrium monosilicate ($Y_2SiO_5$), yttrium disilicate ($Y_2Si_2O_7$), ytterbium monosilicate ($Yb_2SiO_5$), ytterbium disilicate ($Yb_2Si_2O_7$) and/or $Sc_2Si_2O_7$. They may be composed of rare earth aluminates and derivatives, such as yttrium aluminate ($Y_4Al_2O_9$), calcium aluminates such as calcium di-aluminate ($CaAl_4O_7$) barium strontium aluminum silicate ($Ba_{1-x}Sr_xAl_2Si_2O_8$), and/or of titanates, such as hafnium titanate ($HfTiO_4$), or zirconium titanate ($ZrTiO_4$). In other embodiments they may be composed of zirconate perovskites, such as barium zirconate ($BaZrO_3$), and/or barium hafnate ($BaHfO_3$). The hollow microspheres may also be composed of one or more other compounds, including monoclinic hafnia (m-$HfO_2$), scandium tantalate ($ScTaO_4$), aluminosilicate glasses, mullite ($Al_6Si_2O_{13}$), amorphous silicon oxycarbide (SiOC), zircon (ZrSiO4), silicon aluminum oxynitrides (SiAlON), cordierite ($Mg_2Al_4Si_5O_{18}$), zinc aluminate spinel ($ZnAl_2O_4$), yttrium gallates (such as $Y_3Ga_5O_{12}$), and/or magnesium aluminate spinel ($MgAl_2O_4$), or of combinations of the above-listed compounds. As used herein, the term "rare earth" refers to an element selected from the following list: scandium, yttrium, lanthanum, cerium, praseodymium, neodymium, samarium, europium, gadolinium, terbium, dysprosium, holmium, erbium, thulium, ytterbium, and lutetium.

Zirconate perovskites, hafnium titanate, zirconium titanate, monoclinic yttrium aluminate ($Y_4Al_2O_9$), scandium tantalate and monoclinic hafnia all have relatively low coefficients of thermal expansion, with the following approximate values, in parts per million per ° C.: rare-earth disilicates: 4, rare-earth monosilicates: 7, scandium disilicate: 5, mullite: 6, aluminosilicate glass: 4, amorphous silicon oxycarbide: 3, zircon: 6, hafnium titanate: 6, zirconium titanate: 6, monoclinic yttrium aluminate: 6, scandium tantalate: 3, monoclinic hafnia: 3, magnesium aluminate spinel: 7, and barium zirconate: 7. Hafnium titanate and zirconium titanate are thought to have high temperature capability. Monoclinic yttrium aluminate, scandium tantalate and monoclinic hafnia are thought to have a low steam recession rate. Monoclinic hafnia, however, undergoes multiple phase transformations which may cause microcracking on thermal cycling. Silicon oxycarbide has a low coefficient of thermal expansion and good high temperature stability in oxidizing environments. Aluminosilicate glass has a low CTE. Mullite has a CTE of approximately 6 parts per million per ° C. and an intermediate steam recession rate and could be a suitable TBC material for silica and alumina based substrates. Zircon has a CTE of approximately 7 parts per million per ° C. and therefore is also more suitable for alumina-based substrates.

Various fabrication methods may be utilized to form hollow microspheres 120 of the desired materials. In one embodiment, the hollow microspheres 120 are fabricated by coating spherical templates, which are then either pyrolyzed during a carefully tailored heat treatment or which remain in place after being coated. The spherical templates may be hollow or solid polymer spheres that can be pyrolyzed, or ceramic hollow spheres that are compatible with various coating compositions. In one embodiment, cenospheres, e.g., Fillite™ cenospheres, composed of 30% $Al_2O_3$ and 60% $SiO_2$, with a melting temperature above 1400° C. and a bulk density of 0.4 g/cc, are utilized. In other embodiments, hollow templates with even higher temperature capability, such as hollow alumina spheres with a melting temperature of 2070° C., or hollow aluminum phosphate ($AlPO_4$) spheres with a melting temperature of 1800° C. are utilized.

The thermal barrier coating 110 may be formed from hollow microspheres 120 (in various suitable sizes) utilizing various suitable methods. In one embodiment illustrated in FIG. 2A, a layer of hollow microspheres 120 is applied to the ceramic substrate and sintered. The layer of hollow microspheres 120 may be applied by any of various suitable methods, e.g., involving first forming a slurry of the hollow microspheres 120, and then applying the slurry to the ceramic substrate 100 utilizing brushing or painting, spraying, dipping the ceramic substrate 100 in the slurry, or slip-casting, and allowing the slurry to dry. A binder may be added to the slurry to insure the integrity of the coating after drying, i.e., to prevent the layer of hollow microspheres 120 from crumbling or flaking off of the ceramic substrate 100 as the slurry dries. In a slip-casting process the ceramic substrate 100 absorbs a significant portion of the liquid of the slurry as the slurry dries. In other processes, a thicker slurry may be utilized, making the absorption of liquid into the ceramic substrate 100 less important. Once the slurry has dried, it may be sintered by heating, e.g., for two to five hours at a temperature in the range of 1200° C. to 1400° C.

In another embodiment illustrated in FIG. 2B, a slurry is formed of the hollow microspheres 120 (in various suitable sizes), together with a nanopowder of a material that acts as a binder 210 during sintering. Materials that may be suitable for use as a binder 210 include $SiO_2$, $SiO_2$ based glass with a softening point tailored to promote adhesion of the spheres at the selected consolidation temperature, e.g. 1000° C., and transient liquid phase materials that melt at a lower temperature and then react with the hollow microsphere material to form a higher-melting phase that acts as a binder 210 and is stable at the operating temperature. For example, for hollow microspheres 120 composed of a rare-earth silicate (e.g. $Y_2Si_2O_7$), such a binder 210 may be $Na_6Si_8O_{19}$ or a related sodium silicate composition. Sodium silicate $Na_6Si_8O_{19}$ melts at 800° C. and will then react with $Y_2Si_2O_7$ to form higher melting phases such as $NaYSi_2O_6$ or $NaY_9Si_6O_{26}$. Small amounts of Na and Si can also be dissolved into $Y_2Si_2O_7$ as a solid solution. A small amount of sodium silicate (e.g., 1-7 weight %) may be added to hollow rare earth silicate spheres as powder or as a coating on the spheres. After applying the slurry containing the hollow microspheres 120 to the ceramic substrate 100, the slurry containing the hollow microspheres 120 may be dried and then heat treated, and the sodium silicate may melt at 800° C. and start reacting with the rare earth silicate. The liquid phase sodium silicate may aid in densification of the coating and the reaction products may then act as a binder 210 between the spheres.

In another embodiment illustrated in FIG. 2C, a slurry is formed of the hollow microspheres 120 (in various suitable sizes), together with a nanopowder of a material that acts as a matrix 220 in which the hollow microspheres 120 are embedded. The material utilized for the nanopowder may be selected according to criteria similar to those for selecting the material for the hollow microspheres 120, i.e., a material may be selected that has a low coefficient of thermal expansion, a low elastic modulus, high temperature capability, and a low steam recession rate. In addition a material may be selected that will not react with the material of the hollow microspheres 120, and that has a similar coefficient of thermal expansion, to avoid having thermal cycling cause microcracking.

Selecting the same material for the hollow microspheres 120 and for the nanopowder to form the matrix 220 will insure that the coefficient of thermal expansion of the hollow microspheres 120 and of the matrix 220 are matched, and that the hollow microspheres 120 will not react with the matrix 220. When the material of the hollow microspheres 120 is the same as that of the matrix 220, the hollow centers of the hollow microspheres 120 appear as bubbles in the surrounding material, which may be uniform except for the presence of the bubbles. In one embodiment such a structure may be formed by forming a slurry of polymer spheres and a nanopowder of a suitable matrix material, and, after applying the slurry to the ceramic substrate 100 and allowing it to dry, pyrolyzing the polymer spheres and sintering the nanopowder, to form a matrix 220 with bubbles. A thermal barrier coating formed according to embodiments of the present invention may have a high void volume fraction, exceeding 60% (i.e., the fraction of the total volume of the material that is contributed by voids inside the material may exceed 60%), e.g., a void fraction between 60% and 95%. Other embodiments may have void volume fractions exceeding 70%, 80%, or 90%. A major part of the void volume, i.e., more than 50% by volume (or, e.g., between 50% and 99% by volume), may be composed of closed porosity voids (i.e., voids each of which is a volume without openings), such as the interiors of closed hollow microspheres. In other embodiments more than 60%, 70% or 80% of the void volume may be composed of closed porosity voids. A higher volume fraction of ceramic may increase the strength of the resulting coating. The compressive "crush" strength can be utilized as a measure of structural integrity and it can be estimated with the following equation:

$$\sigma_{pl}/\sigma_{y,s} \approx 0.3(\rho/\rho_s)^{1.5},$$

where $\sigma_{pl}$ is the plateau or crush strength of the hollow sphere material, $\sigma_{y,s}$ is the yield strength of the solid constituent material, $\rho$ is the density of the hollow sphere material and $\rho_s$ is the density of the solid constituent material.

Figure 3B:
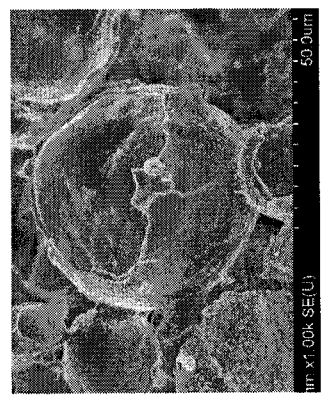
FIG. 3B is a scanning electron micrograph of hollow microspheres sintered together with a binder according to an embodiment of the present invention.
Figure 3A:
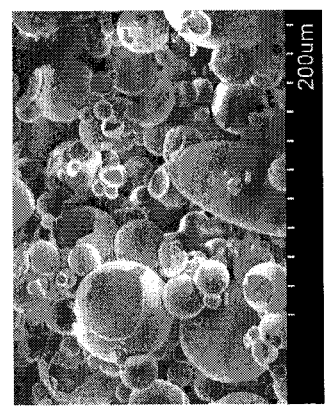
FIG. 3A is a scanning electron micrograph of hollow microspheres sintered together according to an embodiment of the present invention.

The formation of a thermal barrier coating 110 according to the embodiments of FIGS. 2A, 2B, and 2C has been demonstrated with materials based on hollow glass microspheres; scanning electron micrographs of the resulting composite materials (i.e., sintered hollow microspheres 120, hollow microspheres 120 sintered with a binder 210, and hollow microspheres 120 sintered in a matrix 220) are shown in FIGS. 3A, 3B, and 3C, respectively. The three types of cellular architectures result in different volume fractions of porosity. The thermal conductivity of these materials is very low, as validated by laser flash thermal conductivity measurements.

Figure 4:
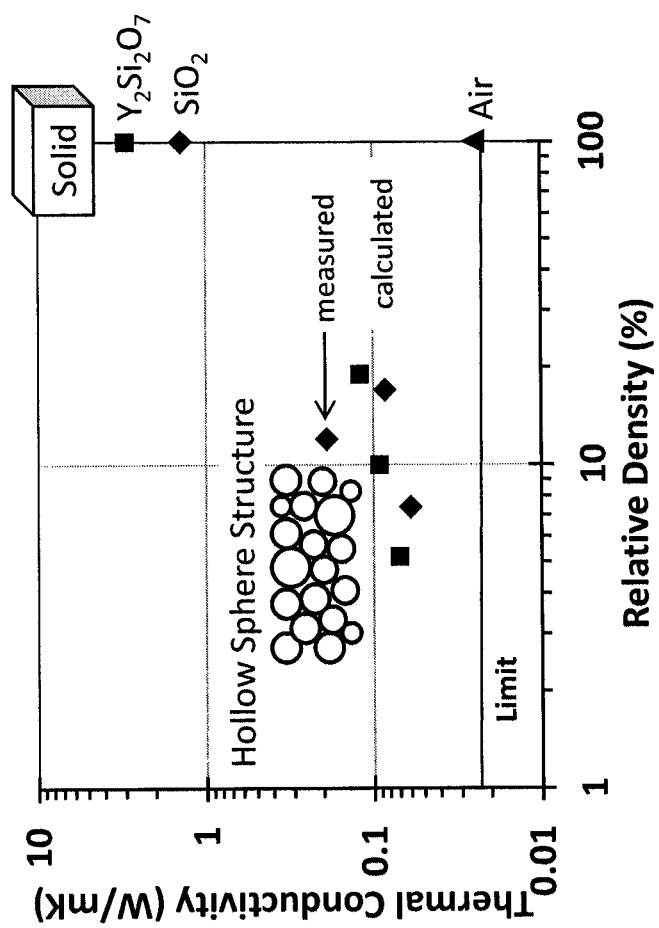
FIG. 4 is a graph of thermal conductivities of several materials according to an embodiment of the present invention.

FIG. 4 shows the thermal conductivity of $Y_2Si_2O_7$ and of $SiO_2$ in their dense state and in the material of thermal barrier coatings 110 of various relative densities according to embodiments of the present invention. All of the data points in the graph represent calculated values, except for the one point designated as "measured." The calculated values of thermal conductivity shown were calculated utilizing the following equation:

$$\lambda = \frac{2V_{ext}\lambda_{ext} + \lambda_{sph}(3 - 2V_{ext})}{3 - V_{ext} + V_{ext}(\lambda_{sph}/\lambda_{ext})},$$

where $V_{ext}$ is the volume fraction of the external phase (air or binder), $\lambda_{ext}$ is the conductivity of the external phase (air or binder), and $\lambda_{sph}$ is the conductivity of the spheres (shell+internal air). This equation takes into account only heat transfer by conduction. Convective and radiative heat transfer can be neglected due to the small size of the hollow microspheres 120.

The thermal barrier coating 110 may be utilized to shield silica-based foams from temperatures in excess of 2500° F. and exhibit high durability and minimal water vapor hot gas corrosion and erosion. The thermal barrier coating 110 may achieve a very low thermal conductivity by virtue of its cellular architecture (high porosity and closed celled structure), which makes it possible to select oxides not suitable for use in related art thermal barrier structures, oxides which may have superior durability and erosion resistance and a well-matched coefficient of thermal expansion. In one embodiment the thermal barrier coating 110 is composed of hollow yttrium disilicate microspheres with a diameter of 35 microns and a wall thickness of 1 micron, that are sintered together onto a silica-based ceramic foam utilized in exhaust systems of jet engines. Such a thermal barrier coating 110 may exhibit a calculated thermal conductivity of 0.09 W/mK, which is a factor of 10 lower than related art zirconia-based thermal barriers, while providing much better cyclic durability due to a lower mismatch in the coefficient of thermal expansion and due to a lower elastic modulus. All three benefits may be provided by the advantageous cellular architecture.

Thermal barrier coatings 110 according to embodiments of the present invention lack several disadvantages that related art coatings may have. Such related art coatings may be composed of 7 wt % yttria stabilized zirconia (7YSZ), which may be applied by electron beam physical vapor deposition or thermal spray deposition on nickel-based superalloy components (e.g., combustors, blades, shrouds, or nozzles). The coefficient of thermal expansion of 7YSZ ($11*10^{-6}$ $K^{-1}$) is large for use with a ceramic foam substrate, which may cause spallation of the coating upon thermal cycling due to coefficient of thermal expansion mismatch stresses. Moreover, the phase stability of 7YSZ is poor above 1200° C., which may lead to phase separation and transformation of the yttria-poor phase to monoclinic zirconia accompanied by a volume expansion that may shatter the coating.

Figures 5A, 5B, 5C:
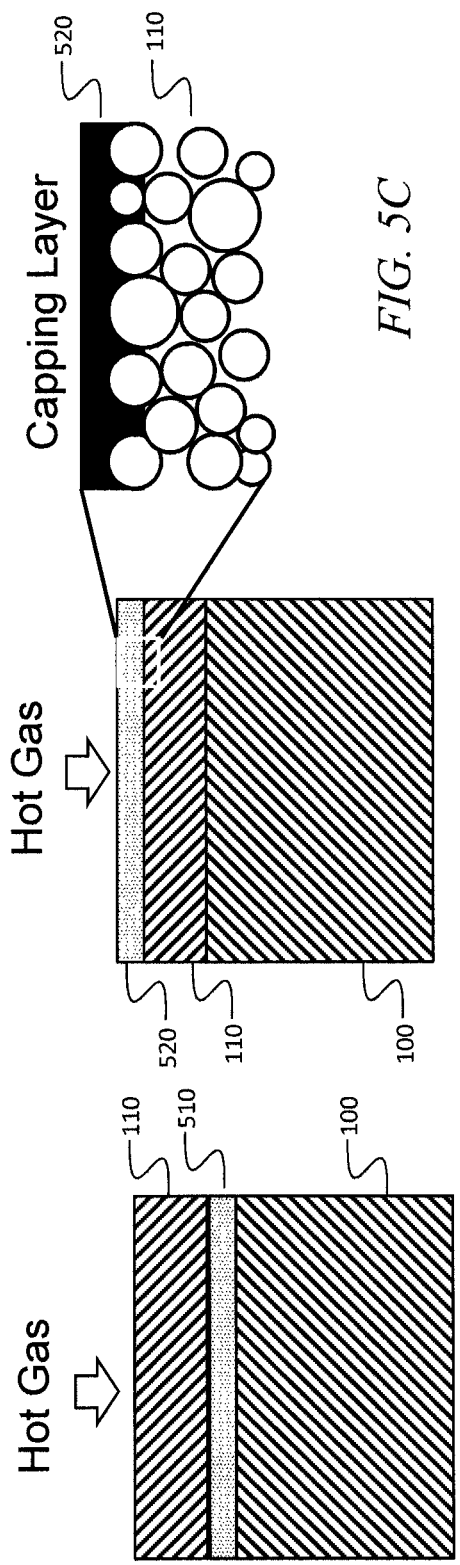
FIG. 5A is a schematic layer diagram of a thermal barrier coating on a ceramic substrate with an intervening bond layer according to an embodiment of the present invention.
FIG. 5B is a schematic layer diagram of a thermal barrier coating on a ceramic substrate with a capping layer on the thermal barrier coating according to an embodiment of the present invention.
FIG. 5C is a magnified view of a portion of FIG. 5B, showing a thermal barrier coating and a capping layer on the thermal barrier coating according to an embodiment of the present invention.

Referring to FIG. 5A, a bond coat 510 may be formed between the thermal barrier coating 110 and the ceramic substrate 100, to promote adhesion, or a barrier layer may be applied to mitigate any chemical incompatibility between the thermal barrier coating 110 and the ceramic substrate 100. Such a bond coat 510 may be formed on the ceramic substrate 100 before forming the thermal barrier coating 110. The bond coat 510 may be applied by dip coating in a slurry or solution, or by painting or spraying on a slurry or solution, allowing the slurry to dry, and subjecting the assembly to a sintering or heat treatment process. Alternatively the bond coat 510 may be applied utilizing a thermal spray, e.g. an air plasma spray. The bond coat 510 may be composed, for example, of $SiO_2$, or of $Al_2O_3$, or of a mixture of these two materials which may also contain $B_2O_3$.

Referring to FIG. 5B, in one embodiment a dense capping layer 520 is applied to the top of the thermal barrier coating 110 to provide a dense, smooth surface and minimize the area available for hot gas erosion. The capping layer 520 may include or consists of the same material as the hollow spheres or the matrix 220. The capping layer 520 may be formed by dipping or painting with slurry of solid (i.e., non-hollow) microparticles, that are small enough to form a dense layer after sintering, e.g., the microparticles may have a size of 50 microns or less, to reduce or minimize the porosity of the capping layer 520. The capping layer 520 may be applied after sintering of the layer containing the hollow microspheres 120, and sintered in a separate sintering process, or it may be applied after the slurry for forming the layer containing the hollow microspheres 120 has dried, and then both layers may be sintered simultaneously, in one sintering process.

A thermal barrier coating 110 formed according to an embodiment of the present invention may have a number of advantages over related art systems for thermal and environmental protection. The thermal barrier coating 110 formed according to an embodiment of the present invention may have a lower thermal conductivity (e.g., less than 1 W/mK), a lower coefficient of thermal expansion, which may be matched to silica-based substrates, a lower in-plane modulus (than related art systems which may have non-isotropic elastic moduli) resulting in lower thermal stresses on thermal cycling, higher resistance to water vapor hot gas corrosion, and a higher temperature capability.

Embodiments of the present invention may be utilized to provide protection, from heat and erosive high velocity exhaust flow, to the underlying ceramic structure in a jet engine exhaust system. Applications for embodiments of the present invention include scramjet combustors, high speed vehicle acreage thermal protection, thermal barrier coatings for jet engine exhaust structures, thermal barrier coatings for protection of high speed vehicles including reusable hypersonic strike and surveillance aircraft, hypersonic weapons and reusable rocket-based boosters, thermal and environmental barrier coatings for exhaust nozzles of commercial aircraft, and commercial furnace liners. Embodiments of the present invention may further find use in commercial and military jet engine applications as thermal barrier material on combustors, hot section blades, shrouds and nozzles, and exhaust structures (e.g. flaps and liners) if the components are fabricated from materials with a low coefficient of thermal expansion, such as SiC/SiC ceramic matrix composite (with a coefficient of thermal expansion of 4-5 parts per million per ° C.). Embodiments of the present invention may have similar applications in scramjet engines.

In one embodiment a coating is composed of hollow microspheres of amorphous aluminosilicate, e.g Fillite™ cenospheres with 34%-39% $Al_2O_3$, 55%-65% $SiO_2$ and 2% $Fe_2O_3$, or amorphous silicon oxycarbide. Hollow spheres with a range of diameters, typically between 2% and 20% of the coating thickness, and a wall thickness between 2%-10% of the diameter, are used. The hollow spheres are sintered together with a suitable ceramic binder resulting in a coating with at least 60% void volume fraction, whereby the majority of these voids are closed porosity. This coating is applied to a ceramic foam or ceramic matrix composite substrate. The selected amorphous aluminosilicate or silicon oxycarbide coating material ensures a low CTE of 4 or 3 parts per million per ° C. respectively, which matches the CTE of the substrate well and mitigates thermal strains. Furthermore the amorphous nature of both materials circumvents CTE anisotropy which is common in other oxides with low CTE and may cause micro-cracking. The high volume fraction of closed porosity results in a very low thermal conductivity on the order of 1 W/mK or lower and a high in-plane compliance that can accommodate thermal strains.

Although exemplary embodiments of a thermal and environmental barrier coating for ceramic substrates have been specifically described and illustrated herein, many modifications and variations will be apparent to those skilled in the art. For example, as will be understood by one of skill in the art, the composition of compounds described herein may vary slightly, e.g., by up to 3%, from those of the chemical formulas disclosed, while still providing some or all of the benefits of embodiments of the present invention. Accordingly, it is to be understood that a thermal and environmental barrier coating for ceramic substrates constructed according to principles of this invention may be embodied other than as specifically described herein. The invention is also defined in the following claims, and equivalents thereof.

What is claimed is:

1. An article, comprising:
a ceramic substrate;
a thermal barrier coating covering a surface of the ceramic substrate, the thermal barrier coating having:
a void volume fraction of at least 60% and a major part of the void volume being closed porosity,
the thermal barrier coating comprising, as a major component, a plurality of hollow particles, the plurality of hollow particles comprising, as a major component, a rare-earth silicate,
each of the plurality of hollow particles having:
a maximum interior dimension less than 1 millimeter (mm) and greater than 5 micrometers, and
a maximum wall thickness less than 1/10 of the maximum interior dimension,
wherein the plurality of hollow particles are embedded in a matrix and the material of the matrix is selected from the group consisting of: rare-earth gallates, hafnium titanates, zirconium titanates, scandium tantalates, and combinations thereof; and
a capping layer covering a portion of a surface of the thermal barrier coating, the capping layer having a porosity less than 10% and a thickness less than 1/10 of the thickness of the thermal barrier coating, and wherein the capping layer comprises the same rare-earth silicate as the plurality of hollow particles, and wherein the same rare-earth silicate is selected from the group consisting of yttrium monosilicate ($Y_2SiO_5$), yttrium disilicate ($Y_2Si_2O_7$), ytterbium monosilicate ($Yb_2SiO_5$), ytterbium disilicate ($Yb_2Si_2O_7$), and scandium disilicate ($Sc_2Si_2O_7$).

2. The article of claim 1 wherein a portion of an exterior surface of each of the plurality of hollow particles is coated with a binder coating, the binder coating securing the hollow particles together.

* * * * *